(12) United States Patent
Anna et al.

(10) Patent No.: US 7,870,226 B2
(45) Date of Patent: Jan. 11, 2011

(54) METHOD AND SYSTEM FOR AN UPDATE SYNCHRONIZATION OF A DOMAIN INFORMATION FILE

(75) Inventors: Gary Anna, Tucson, AZ (US); Ralph T. Beeston, Tucson, AZ (US); Joel H. Chen, Tucson, AZ (US); Joseph W. Dain, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 11/388,442

(22) Filed: Mar. 24, 2006

(65) Prior Publication Data

US 2007/0226269 A1  Sep. 27, 2007

(51) Int. Cl.
  *G06F 15/16* (2006.01)
(52) U.S. Cl. ...................................... 709/218
(58) Field of Classification Search ................ 709/205, 709/220
  See application file for complete search history.

(56) References Cited

U.S. PATENT DOCUMENTS 5,202,971 A    4/1993  Henson et al.
6,427,213 B1   7/2002  Dao
6,571,270 B1*  5/2003  Lai et al. ..................... 718/101
6,950,820 B2*  9/2005  Bae .............................. 707/10
2001/0016853 A1  8/2001  Kucala
2002/0120597 A1*  8/2002  Bae ............................... 707/1
2003/0225852 A1* 12/2003  Bae .......................... 709/213
2004/0068523 A1  4/2004  Keith, Jr. et al.

* cited by examiner

*Primary Examiner*—Vivek Srivastava
*Assistant Examiner*—Xiang Yu
(74) *Attorney, Agent, or Firm*—David W. Victor; Konrad Raynes & Victor LLP

(57) ABSTRACT

Within a distributed data processing domain including a requester data processing node and one or more target data processing nodes, an update synchronization of a domain information file as stored on each target data processing node with each domain information file including a local information file having local information an individual operation of the requester data processing node and a global information file having global information associated with a collective operation of all of the data processing nodes. First, the requester data processing node detects domain update information including local update information or global update information. Second, the requester data processing node synchronizes an update of the local information file or the global information file of each domain information file as stored on the target data processing node(s) based on the respective local update information or the respective global update information of the detected domain update information.

24 Claims, 14 Drawing Sheets

METHOD AND SYSTEM FOR AN UPDATE SYNCHRONIZATION OF A DOMAIN INFORMATION FILE

FIELD OF THE INVENTION

The present invention generally relates to an update synchronization of an information file of any type. The present invention specifically relates to an update synchronization of each domain information file within a distributed data processing domain where each domain information file includes one or more local information files and a global information file.

BACKGROUND OF THE INVENTION

Distributed data processing domains are designed to handle mission critical processing of data. Typically, a distributed data processing domain requires multiple data processing nodes that span physical boundaries and work in conjunction to process the data with high availability failover capabilities. For this type of node configuration, it can be essential that local information and global information as contained in domain information files stored on the data processing nodes be consistent across the entire distributed data processing domain in order to provide the high availability failover capabilities. This can be achieved even with an update of one of the domain information files by a timely update synchronization of the remaining domain information files whereby all of the domain information files are identical upon conclusion of the update synchronization. However, update synchronization techniques currently are not designed to result in identical domain information files being stored on each data processing node.

For example, one known update synchronization technique provides a capability of a local data processing node to update and make changes to a file on a domain information file on a remote data processing node via various system calls. The drawback to this technique is the failure to store the domain information file one each data processing node and the requirement that the local data processing node be able to execute the needed system calls.

Another update synchronization technique is premised on the use of owner tokens and data management of volume version numbers whereby version numbers of a particular volume are associated with a current owner of a corresponding token. However, drawbacks to this technique are the failure to store the volumes on each data processing node and a need to interact with a database containing information about the version number(s) of the volumes.

SUMMARY OF THE INVENTION

Within a distributed data processing domain including a requester data processing node and one or more target data processing nodes, the present invention provides a new and unique update synchronization of a domain information file as stored on each target data processing node with each domain information file including a local information file having local information associated with an individual operation of the requester data processing node and a global information file having global information associated with an collective operation of all of the data processing nodes.

One form of the present invention is a method for the update synchronization of each domain information file as stored on the target data processing node(s). The method comprises a detection by the requester data processing node of domain update information including local update information or global update information, and a synchronization by the requester data processing node of an update of the local information file or the global information file of each domain information file as stored on the target data processing node(s) based on the respective local update information or the respective global update information of the detected domain update information.

A second form of the present invention is a requester data processing node comprising a processor and a memory storing instructions operable with the processor for the update synchronization of each domain information file as stored on the target data processing node(s). The instructions are executable for a detection by the requester data processing node of domain update information including local update information or global update information, and a synchronization by the requester data processing node of an update of the local information file or the global information file of each domain information file as stored on the target data processing node(s) based on the respective local update information or the respective global update information of the detected domain update information.

A third form of the present invention is a requester data processing node comprising a synchronizing module and a command messenger module for the update synchronization of each domain information file as stored on the target data processing node(s). The synchronizing module is operable to detect the domain update information including local update information or global update information. The command messenger module is operable as commanded by the synchronizing module to synchronize an update of the local information file or the global information file of each domain information file as stored on the target data processing node(s) based on the respective local update information or the respective global update information of the detected domain update information.

The aforementioned forms and additional forms as wells as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENT INVENTION

Figure 1:
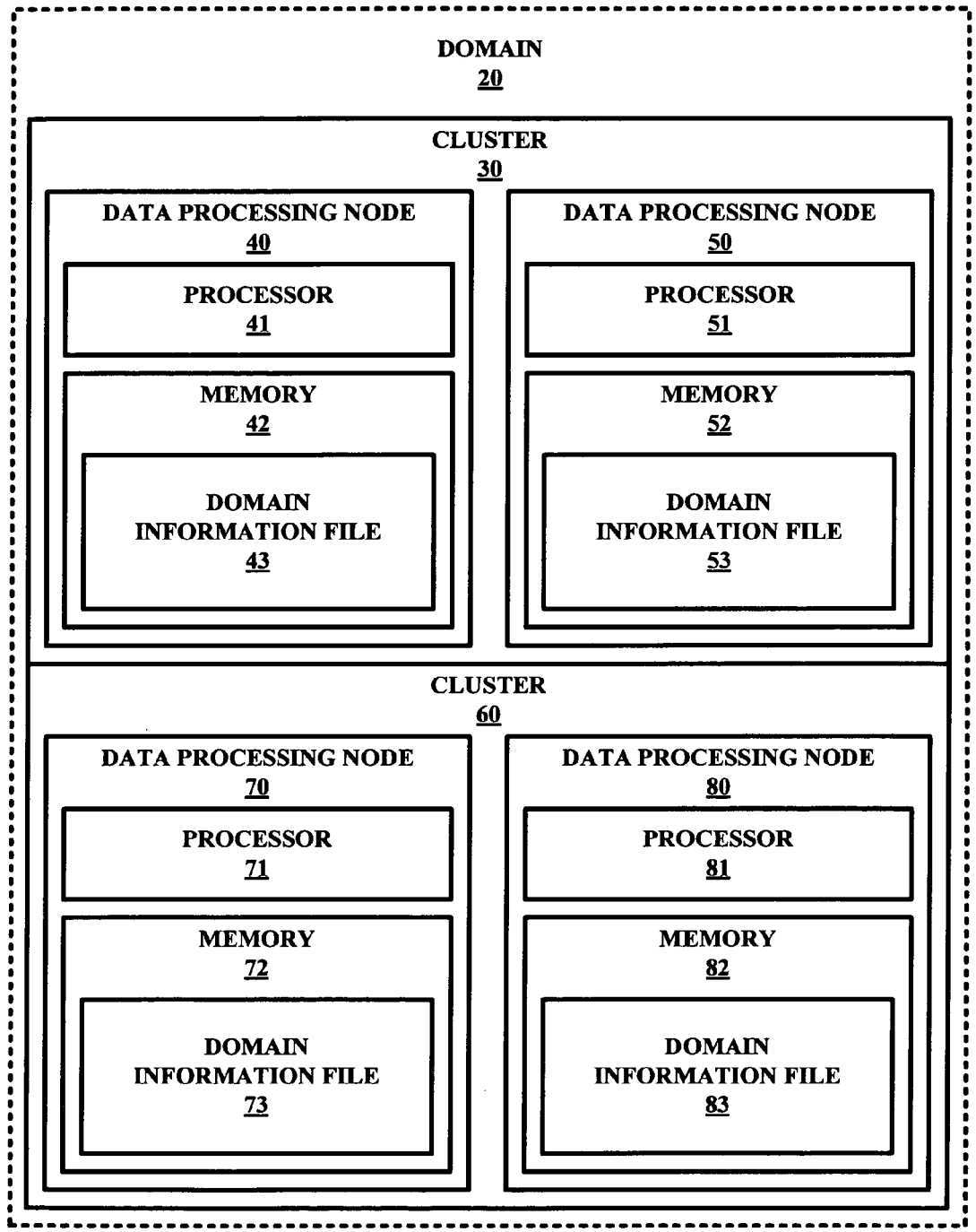
FIG. 1 illustrates one embodiment of distributed data processing domain in accordance with the present invention.

FIG. 1 illustrates a distributed data processing domain 20 employing a cluster 30 and a cluster 60. Cluster 30 includes a data processing node 40 having a processor 41 and a memory 42, and a data processing node 50 having a processor 51 and a memory 52. Cluster 60 includes a data processing node 70 having a processor 71 and a memory 72, and a data processing node 80 having a processor 81 and a memory 82.

Domain information in the form of local information and global information associated with various operational aspects of domain 20 is stored across domain 20. Data processing nodes 40, 50, 70, 80 collectively work to process and update the domain information with a high availability failover capability in accordance with the inventive principles of the present invention. Specifically, processors 41, 51, 71, 81 are collectively responsible for processing and updating respective domain information files 43, 53, 73, 83 as stored in their respective memories 42, 52, 72 and 82 in a timely manner that ensures domain information files 43, 53, 73, 83 are identical to support the high availability failover capability of domain 20. To this end, processors 41, 51, 71, 81 execute instructions (not shown) stored in their respective memories 42, 52, 72 and 82 for implementing a domain information file update synchronization method of the present invention that is responsive to a generation and/or an acquisition of domain update information by one of the data processing nodes 40, 50, 70 and 80 to ensure domain information files 43, 53, 73, 83 are updated in a timely manner to preserve the identical status of domain information files 43, 53, 73, 83.

Figure 2:
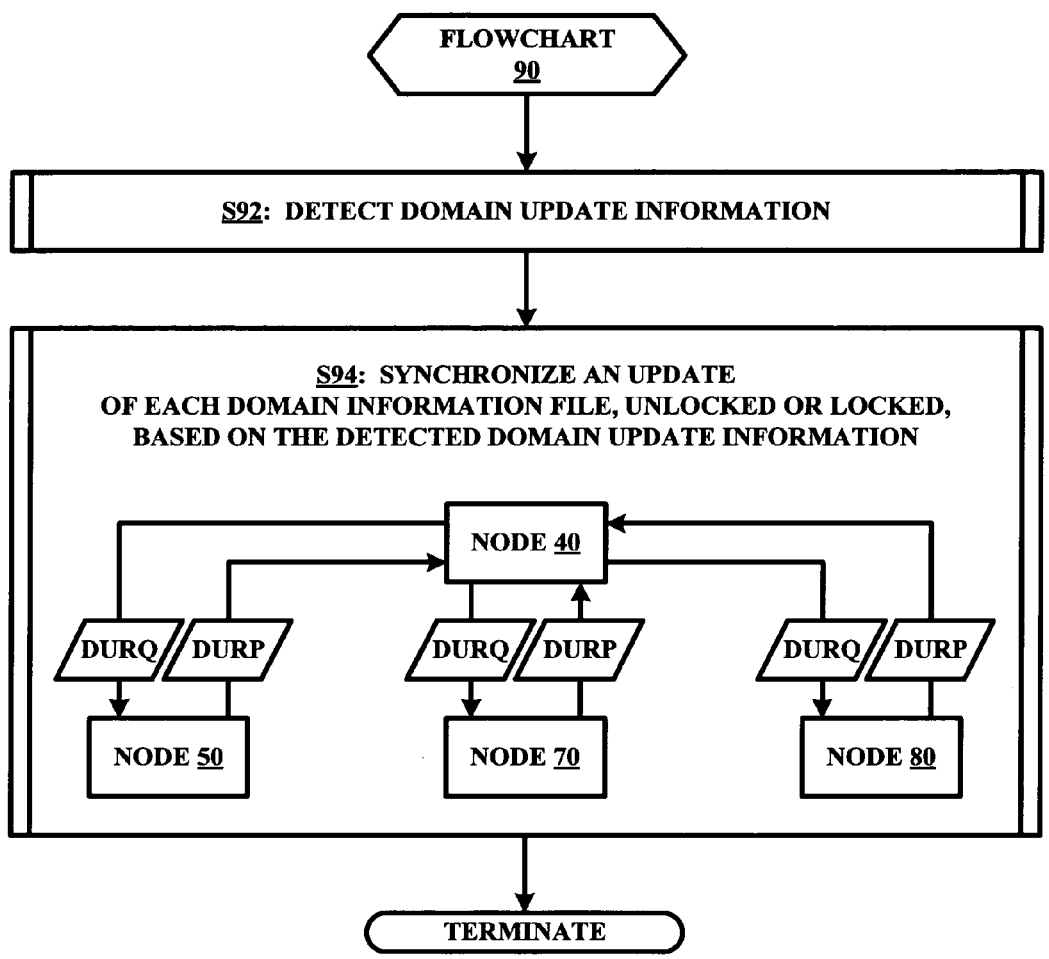
FIG. 2 illustrates a flowchart representative of one embodiment of an update synchronization method in accordance with the present invention.

FIG. 2 illustrates a flowchart 90 representative of the domain information file update synchronization method of the present invention as applied to domain 20, which is premised on one of the data processing nodes serving as a requester data processing node and the remaining data processing nodes serving as target data processing nodes for any given update of the domain information. To facilitate an understanding of this premise of the domain information file update synchronization method of the present invention, flowchart 90 will now be described in the context of data processing node 40 serving as the requester data processing node and data processing nodes 50, 70, 80 serving as the target data processing nodes. Nonetheless, in practice, a domain information file update synchronization policy will govern the rules specifying which data processing node serves as the requester data processing node for any given update of the domain information files. Please note that the term "requester" and "target" as used in herein conjunction with the term "data processing node" are only intended to facilitate an identification of the operational role of each data processing node during an implementation of a synchronization method of the present invention and therefore should not be used to unduly limit or restrict the definition of data processing node as known in the art.

Referring to FIG. 2, a stage S92 of flowchart 90 encompasses a detection of domain update information by data processing node 40. In one embodiment, the domain update information is local update information associated with an individual operation of data processing node 40 that is generated and/or acquired by data processing node 40 within its domain information file 43 in the course of its data processing operation. In an alternative embodiment, the domain update information is global update information associated with a collective operation of data processing nodes 40, 50, 70, 80 that is generated and/or acquired by data processing node 40 within its domain information file 43 in the course of its data processing operation. In either case, the detection of the domain update information serves to designate data processing node 40 as the requester data processing node and to designate the data processing nodes 50, 70 and 80 as target data processing nodes.

Upon a completion of stage S92, requester data processing node 40 proceeds to a stage S94 of flowchart 90 to synchronize an update of domain information files 53, 73 and 83 by target data processing nodes 50, 70 and 80 based on the detected domain update information. For example, as shown in stage S94, requester data processing node 40 synchronizes an update of the domain information files 53, 73 and 83 by communicating an update request message DURQ including the domain update information to target data processing nodes 50, 70 and 80, which in turn provide update reply messages DURP to requester data processing node 40 as an indication of an update of the domain information files 53, 73 and 83 based on the domain update information.

In one embodiment, the domain update information is local update information whereby domain information files 53, 73 and 83 are maintained in an unlocked state during the update synchronization of domain information files 53, 73 and 83. In an alternative embodiment, the domain update information is global update information requiring a synchronized locking of domain information files 53, 73 and 83 by requester data processing node 40 prior to the update synchronization of domain information files 53, 73 and 83. In either case, domain information files 53, 73 and 83 should be in an unlocked state subsequent to a successful completion of stage S94 to enable a full operation of domain 20 unless another reason exist to lock or to maintain a locking of any of the domain information files 53, 73 and 83 subsequent to a successful completion of stage S94.

To facilitate a further understanding of the domain information file update synchronization method represented by flowchart 90, a local information file update synchronization method of the present invention as represented by a flowchart 100 (FIG. 5) and a global information file locking/update synchronization method of the present invention as represented by a flowchart 110 (FIG. 7) will now be described herein in the context of a domain information file storage architecture illustrated in FIG. 3.

Figure 3:
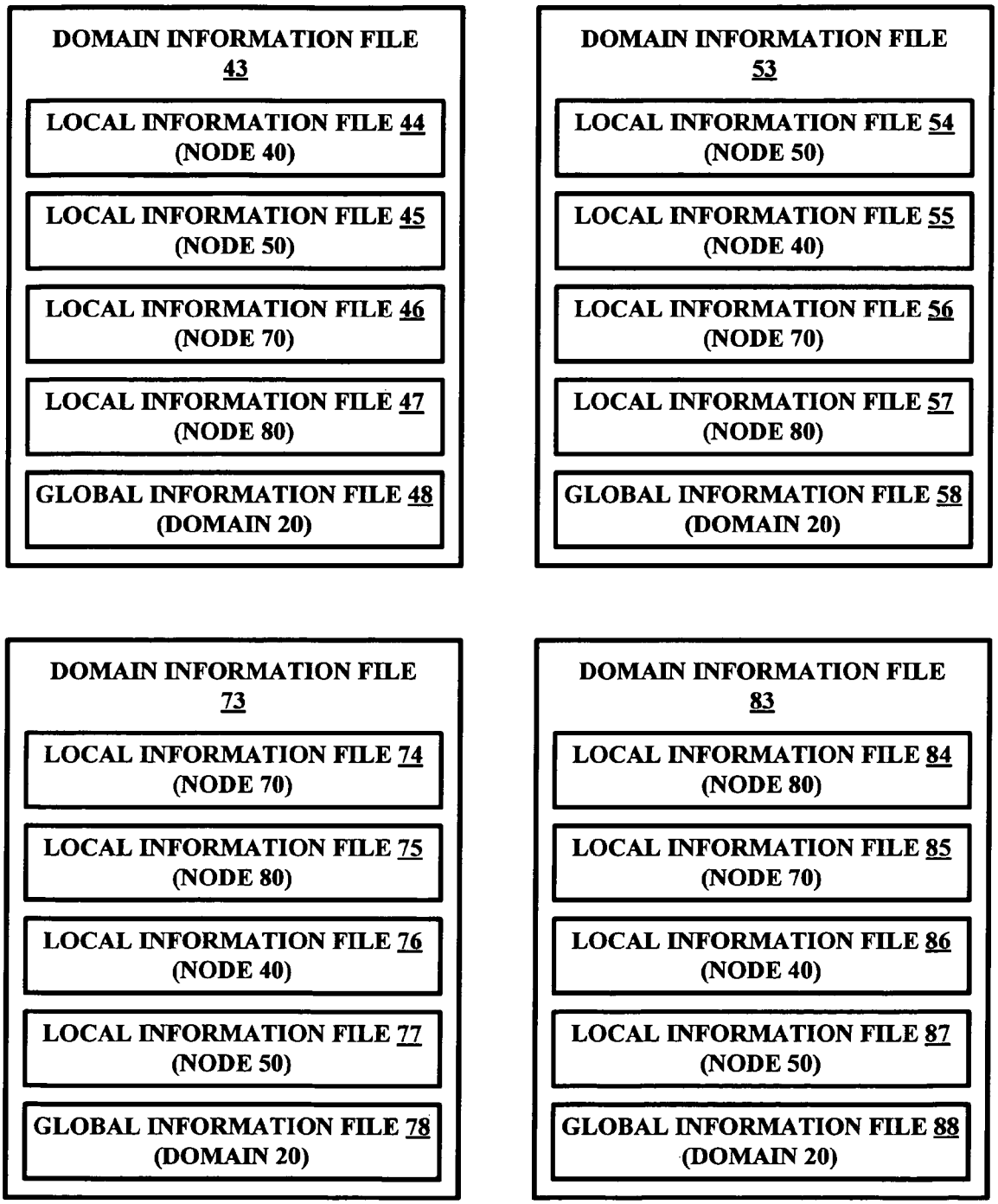
FIG. 3 illustrates one embodiment of a domain information file storage architecture in accordance with the present invention.

Specifically, FIG. 3 illustrates domain information file 43 of data processing node 40 including a local information file 44 having local information associated with an individual operation of data processing node 40, a local information file 45 having local information associated with an individual operation of data processing node 50, a local information file 46 having local information associated with an individual operation of data processing node 70, a local information file 47 having local information associated with an individual operation of data processing node 80, and a global information file 48 having global information associated with a collective operation of data processing nodes 40, 50, 70, 80.

Domain information file 53 of data processing node 50 includes a local information file 54 having local information associated with an individual operation of data processing node 50, a local information file 55 having local information associated with an individual operation of data processing node 40, a local information file 56 having local information associated with an individual operation of data processing node 70, a local information file 57 having local information associated with an individual operation of data processing node 80, and a global information file 58 having global information associated with a collective operation of data processing nodes 40, 50, 70, 80.

Domain information file 73 of data processing node 70 includes a local information file 74 having local information associated with an individual operation of data processing node 70, a local information file 75 having local information associated with an individual operation of data processing node 80, a local information file 76 having local information associated with an individual operation of data processing node 40, a local information file 77 having local information associated with an individual operation of data processing node 50, and a global information file 78 having global information associated with a collective operation of data processing nodes 40, 50, 70, 80.

Domain information file 83 of data processing node 80 includes a local information file 84 having local information associated with an individual operation of data processing node 80, a local information file 85 having local information associated with an individual operation of data processing node 70, a local information file 86 having local information associated with an individual operation of data processing node 40, a local information file 87 having local information associated with an individual operation of data processing node 50, and a global information file 88 having global information associated with a collective operation of data processing nodes 40, 50, 70, 80.

Figure 4:
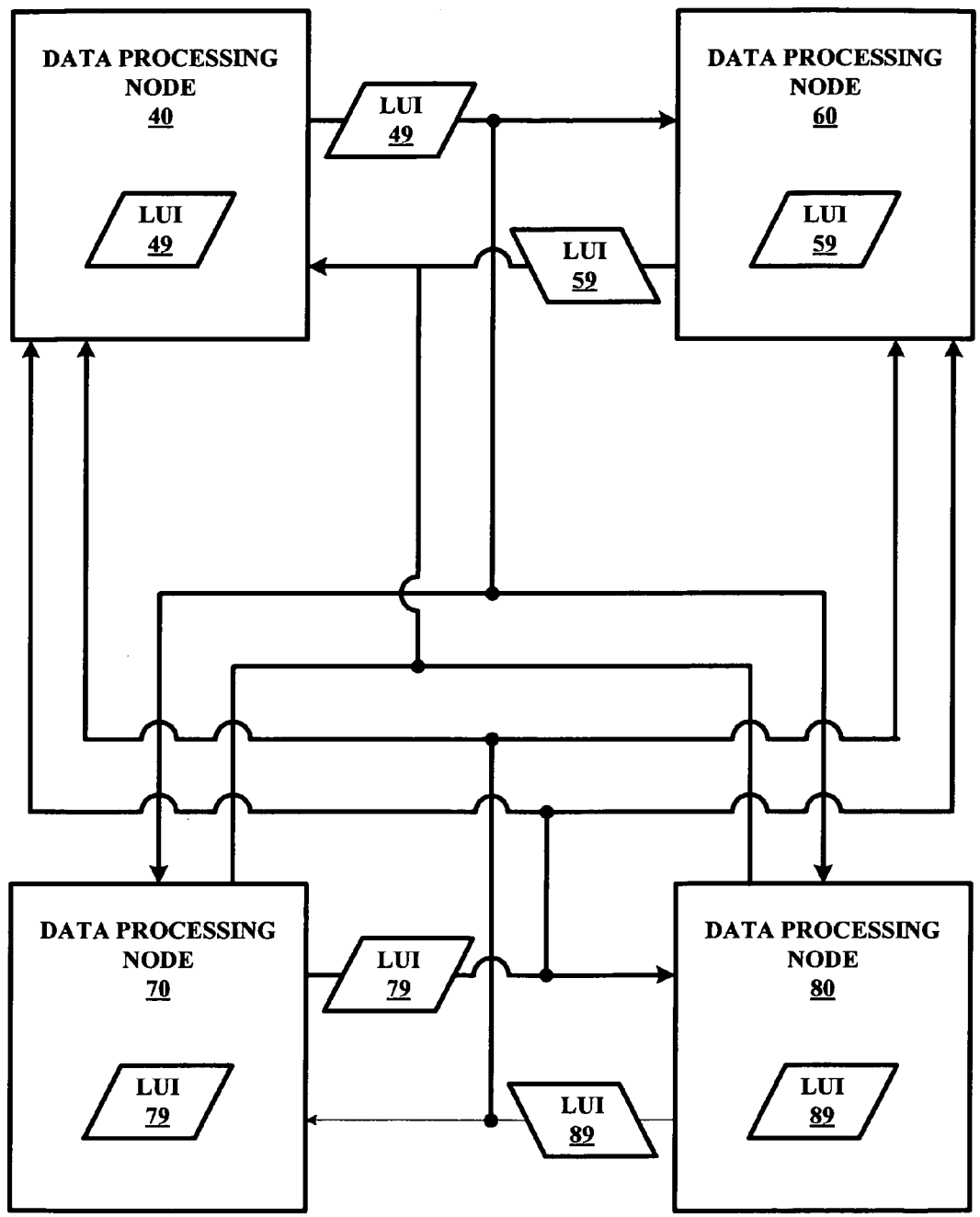
FIG. 4 illustrates an exemplary local update information communication scheme between data processing nodes in accordance with the present invention.

From time to time, data processing node 40 may generate and/or acquire local update information within its local information file 44 and is therefore responsible for synchronizing an update of local information files 55, 76, 86 with the local update information, such as, for example, local update information 49 shown in FIG. 4. Similarly, from time to time, data processing node 50 may generate and/or acquire local update information within its local information file 54 and is therefore responsible for synchronizing an update of local information files 45, 77, 87 with the local update information, such as, for example, local update information 59 shown in FIG. 4.

Likewise, from time to time, data processing node 70 may generate and/or acquire local update information within its local information file 74 and is therefore responsible for synchronizing an update of local information files 46, 56, 85 with the local update information, such as, for example, local update information 79 shown in FIG. 4. Finally, from time to time, data processing node 80 may generate and/or acquire local update information within its local information file 84 and is therefore responsible for synchronizing an update of local information files 47, 57, 75 with the local update information, such as, for example, local update information 89 shown in FIG. 4.

Figure 5:
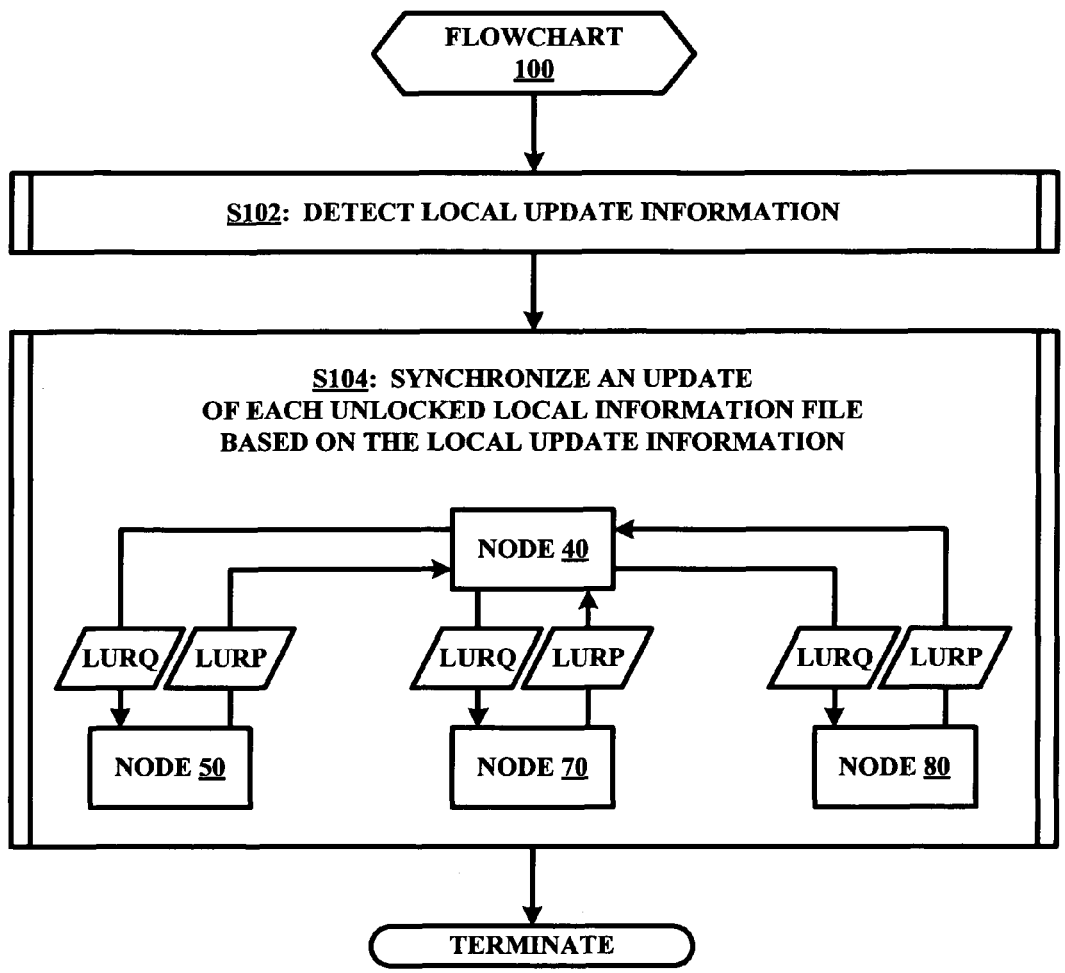
FIG. 5 illustrates a flowchart representative of a first embodiment of a local information file update synchronization method in accordance with the present invention.

FIG. 5 illustrates a flowchart 100 representative of the local information file update synchronization method of the present invention as applied to domain 20, which is also premised on one of the data processing nodes serving as a requester data processing node and the remaining data processing nodes serving as target data processing nodes for any given update of the local information. To facilitate an understanding of this premise of the local information file update synchronization method of the present invention, flowchart 100 will now be described in the context of data processing node 40 serving as the requester data processing node and data processing nodes 50, 70, 80 serving as the target data processing nodes.

Referring to FIG. 5, a stage S102 of flowchart 100 encompasses a detection of local update information by data processing node 40 that has been generated and/or acquired within its local information file 43 in the course of its data processing operation.

Upon a completion of stage S102, requester data processing node 40 proceeds to a stage S104 of flowchart 100 to synchronize an update of unlocked local information files 55, 76, 86 by target data processing nodes 50, 70 and 80 based on the detected local update information. For example, as shown in stage S104, requester data processing node 40 synchronizes an update of the local information files 55, 76, 86 by communicating an update request message LURQ including the local update information to target data processing nodes 50, 70 and 80, which in turn provide update reply messages LURP to requester data processing node 40 as an indication of an update of the local information files 55, 76, 86 based on the local update information.

In an alternative embodiment, requester data processing node 40 can synchronize a locking of local information files 55, 76, 86 prior to the update synchronization of domain information files 55, 76, 86. In this case, target data processing nodes 50, 70, 80 can automatically unlock respective locked domain information files 55, 76, 86 subsequent to a successful completion of stage S104, or requester data processing node 40 can synchronize an unlocking of locked local information files 55, 76, 86 during stage S104 or subsequent to a successful completion of stage S104.

Figure 6:
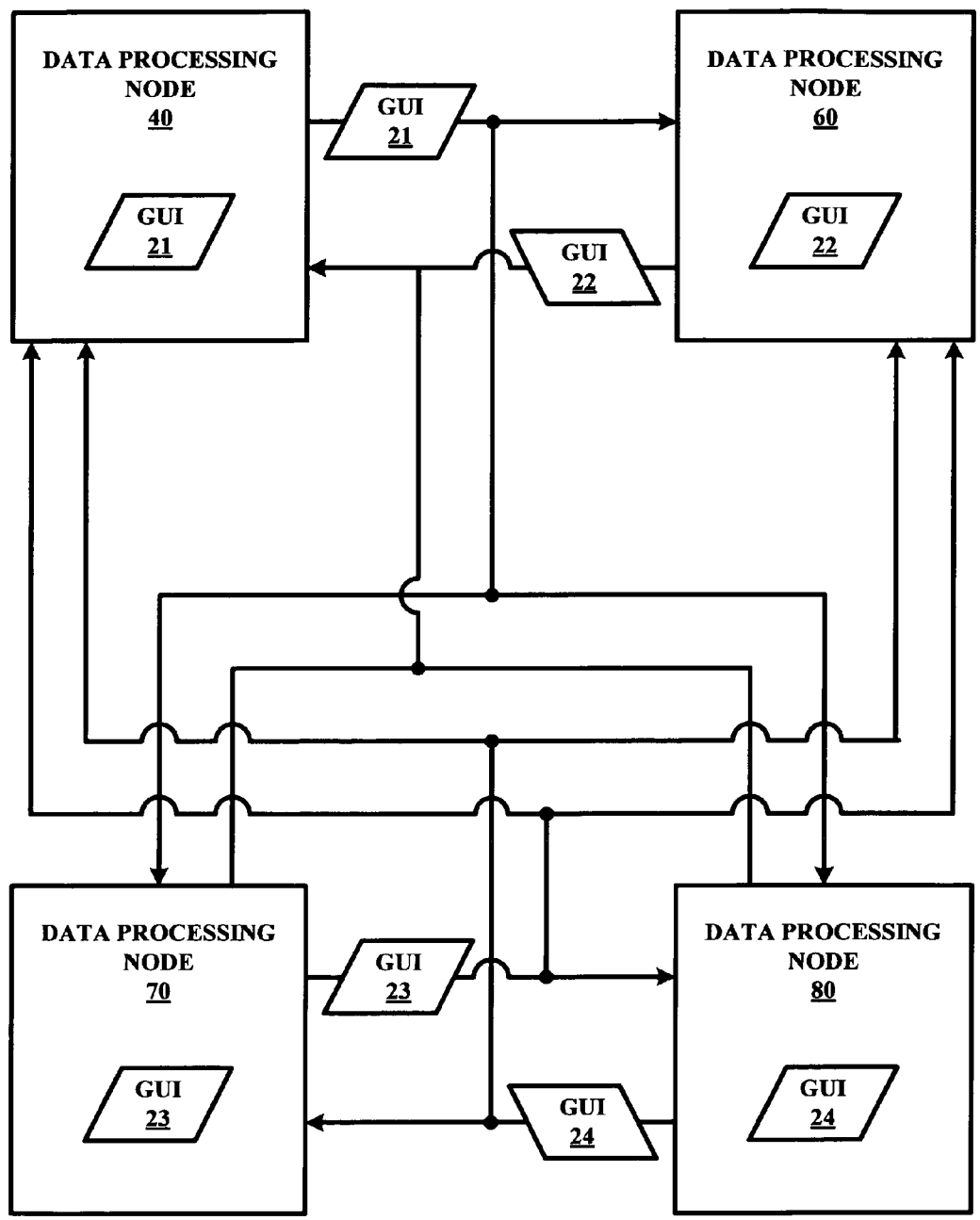
FIG. 6 illustrates an exemplary global update information communication scheme between data processing nodes in accordance with the present invention.

Referring again to FIG. 3, from time to time, data processing node 40 may generate and/or acquire global update information within its global information file 48 and is therefore responsible for synchronizing an update of global information files 58, 78 and 88 with the global update information, such as, for example, global update information 21 shown in FIG. 6. Similarly, from time to time, data processing node 50 may generate and/or acquire global update information within its global information file 58 and is therefore responsible for synchronizing an update of global information files 48, 78 and 88 with the global update information, such as, for example, global update information 22 shown in FIG. 6.

Likewise, from time to time, data processing node 70 may generate and/or acquire global update information within its global information file 78 and is therefore responsible for synchronizing an update of global information files 48, 58 and 88 with the global update information, such as, for example, global update information 23 shown in FIG. 6. Finally, from time to time, data processing node 80 may generate and/or acquire global update information within its global information file 88 and is therefore responsible for synchronizing an update of global information files 48, 58 and 78 with the global update information, such as, for example, global update information 24 shown in FIG. 6.

Figure 7:
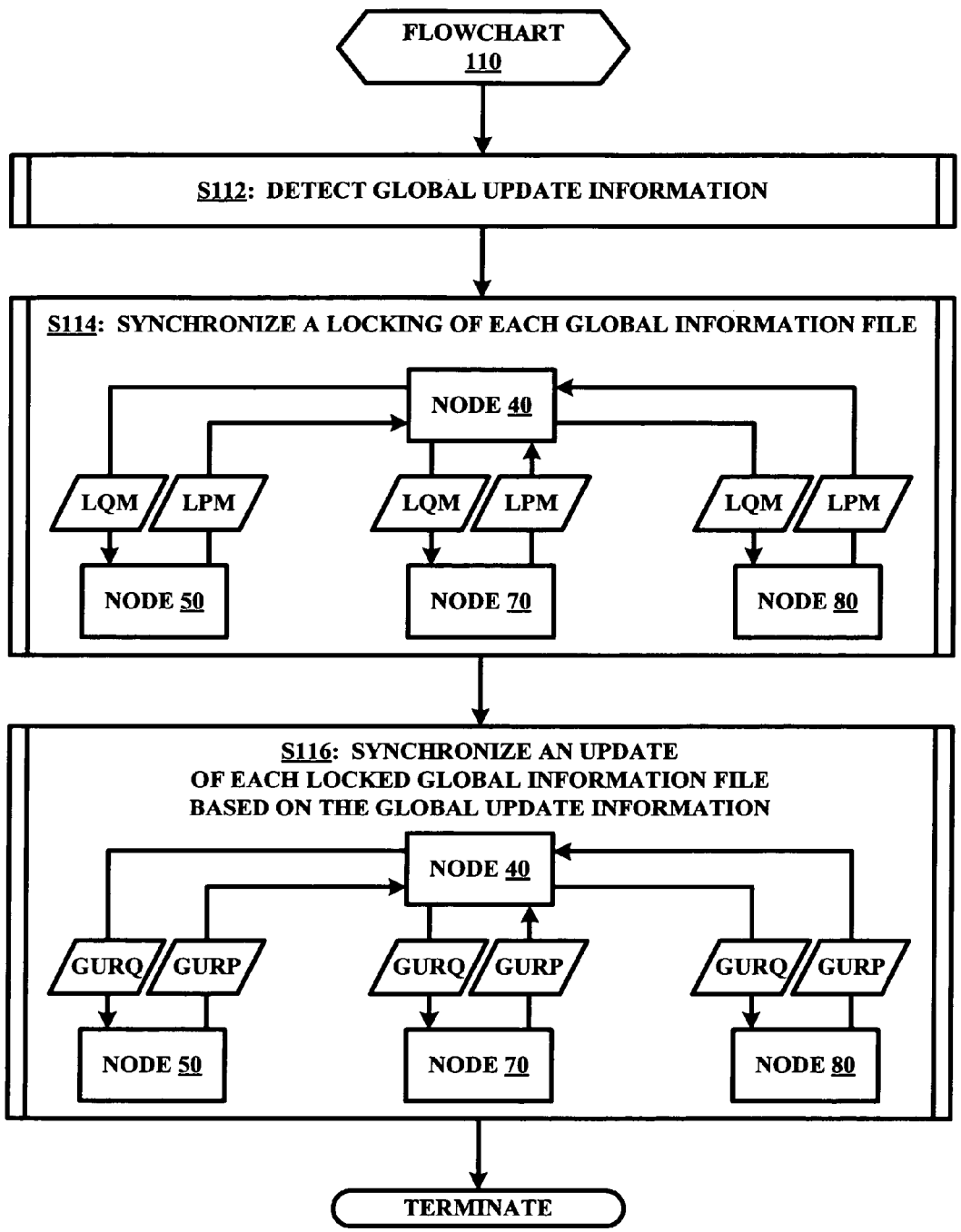
FIG. 7 illustrates a flowchart representative of one embodiment of a global information file locking/update synchronization method in accordance with the present invention.

FIG. 7 illustrates a flowchart 110 representative of a global information file locking/update synchronization method of the present invention as applied to domain 20, which is again premised on one of the data processing nodes serving as a requester data processing node and the remaining data processing nodes serving as target data processing nodes for any given update of the global information. To facilitate an understanding of this premise of global information file locking/update synchronization method of the present invention, flowchart 110 will now be described in the context of data processing node 40 servings as the requester data processing node and data processing nodes 50, 70, 80 serving as the target data processing nodes.

Referring to FIG. 7, a stage S112 of flowchart 110 encompasses a detection of global update information by data processing node 40 that has been generated and/or acquired within its global information file 48 in the course of its data processing operation.

Upon a completion of stage S112, requester data processing node 40 proceeds to a stage S114 of flowchart 110 to synchronize a locking of global information files 58, 78 and 88 by data processing nodes 50, 70, 80. In one exemplary embodiment, as shown in stage S12, requester data processing node 40 synchronizes a locking of global information files 58, 78 and 88 by communicating a locking request message LQM to target data processing nodes 50, 70 and 80, which in turn provide locking reply messages LPM to requester data processing node 40 as an indication of a locking of global information files 58, 78 and 88.

Upon a successful completion of stage S114, requester data processing node 40 proceeds to a stage S116 of flowchart 110 to synchronize an update of the locked global information files 58, 78 and 88 by target data processing nodes 50, 70 and 80 based on the detected global update information. In one exemplary embodiment, as shown in stage S116, requester data processing node 40 synchronizes an update of the locked global information files 58, 78 and 88 by communicating an update request message GURQ including the global update information to target data processing nodes 50, 70 and 80, which in turn provide update reply messages GURP to requester data processing node 40 as an indication of an update of the locked global information files 58, 78 and 88 based on the detected global update information. Upon successful completion of stage S116, flowchart 110 is terminated whereby each target data processing node 50, 70 and 80 can automatically unlock the updated global information files 58, 78 and 88 or requester data processing node 40 can synchronize an unlocking of the updated global information files 58, 78 and 88 by the target data processing nodes 50, 70 and 80 in a manner similar to the execution of stage S112.

In practice, the present invention does not impose any limitations or restrictions of a structural configuration of data processing nodes for implementing the various synchronization methods of the present invention as represented by flowchart 90 (FIG. 2), flowchart 100 (FIG. 5) and flowchart 110 (FIG. 7).

Figure 8:
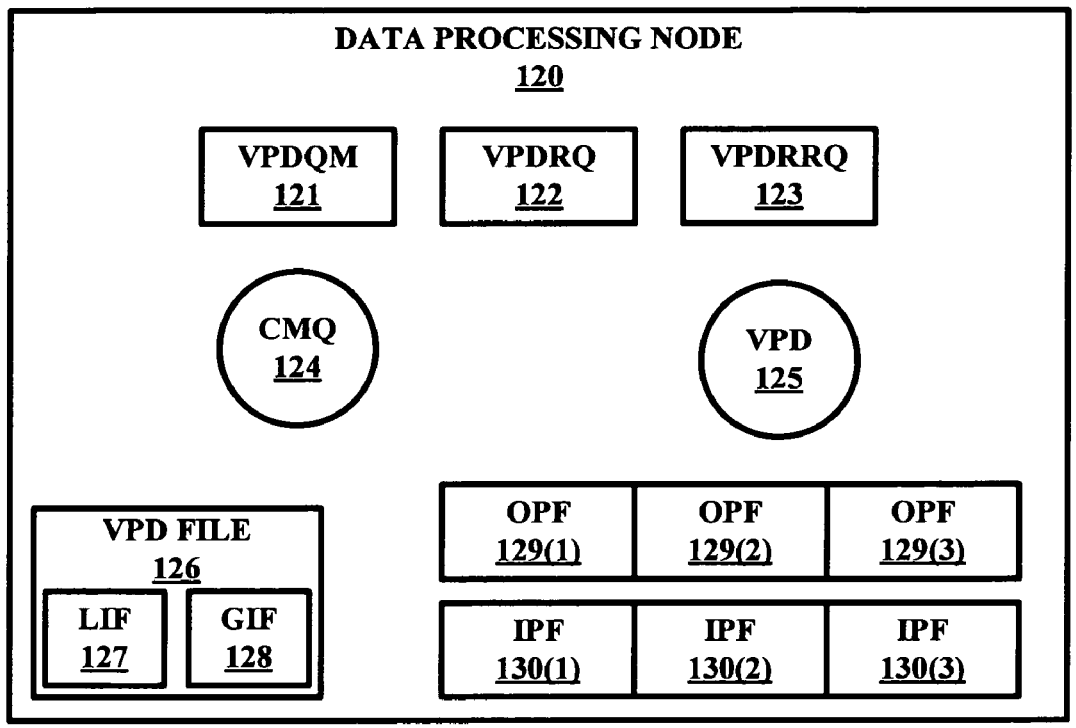
FIG. 8 illustrates one embodiment of a data processing node in accordance with the present invention.

FIG. 8 illustrates an exemplary structural configuration of a data processing node 120 suitable for data processing nodes 40, 50, 70 and 80 (FIG. 1). Data processing node 120 employs a node messenger software/firmware module ("CMQ") 124, a synchronizing software/firmware module ("VPD") 125, a queue manager ("VPDQM") 121, a request queue ("VPDRQ") 122, a request reply queue ("VPDRRQ") 123, a VPD file 126, three (3) outbound pending flags ("OPF") 129 and three (3) inbound pending flags ("IPF") 130.

VPD file 126 contains all relevant local information files ("LIF") 127 and a global information file ("GIF") 128. In one embodiment, VPD file 126 has an XML format.

VPD module 125 interfaces with CMQ module 124 in either a requester capacity or a target capacity to participate in a synchronization of a locking and/or an updating of either one of the local information files 127 or global information file 128 as will be further explained in connection with the description of FIGS. 9-14.

CMQ module 124 interfaces with VPDQM manager 121, VPDRQ queue 122 and VPDRRQ queue 123 to route various messages to other data processing nodes via global identifiers as commanded by VPD module 125 as will be further explained in connection with the description of FIGS. 9-14.

OPF flags 129 are used by VPD module 125 to track the status of request messages provided to target data processing nodes under the control of VPD module 125 when VPD module is serving a requester data processing node as will be further explained in connection with the description of FIGS. 9-14.

IPF flags 130 are used by VPD module 125 to track the status of request messages provided to VPD module 125 under the control of a requester data processing node when VPD module 125 is serving a target data processing node as will be further explained in connection with the description of FIGS. 0-14.

Figure 9:
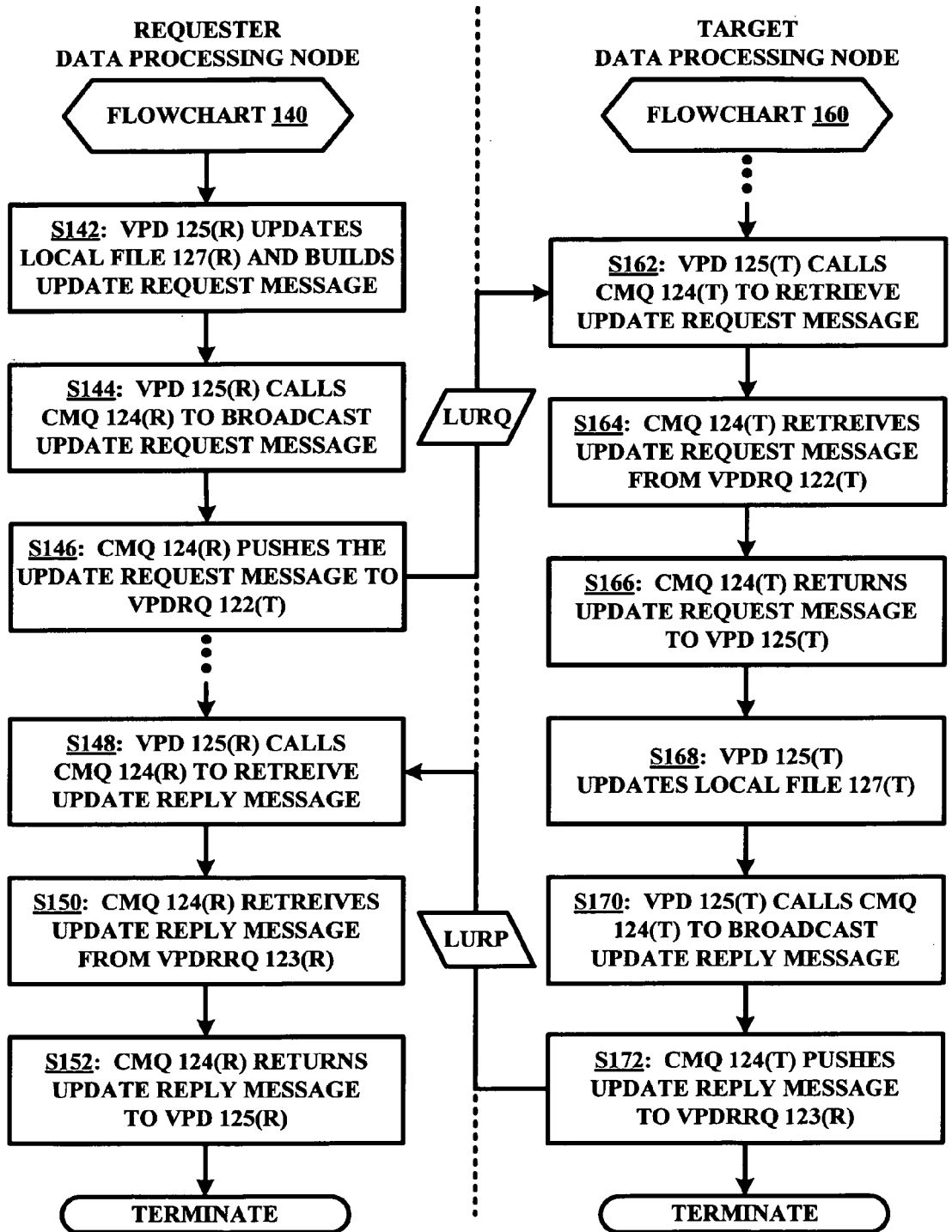
FIG. 9 illustrates a flowchart representative of a second embodiment of a local information file update synchronization method in accordance with the present invention.

FIG. 9 illustrates a flowchart 140 and a flowchart 160 representative of a local information file update synchronization method as respectively implemented by a requester data processing node and a target data processing node structurally configured in accordance with FIG. 8. To facilitate an understanding of this local information file update synchronization method of the present invention, the subsequent description of flowchart 140 is based on requester data processing node 120(R) shown in FIG. 10 and the subsequent description of flowchart 160 is based on a target data processing node 120(T) shown in FIG. 10.

A stage S142 of flowchart 140 encompasses VPD module 125(R) of requester data processing node 120(R) updating the relevant local information file 127(R) of VPD file 126(R) based on local update information generated by requester data processing node 120(R) or acquired by requester data processing node 120(R) via an application program interface. Stage S142 further encompasses VPD module 125(R) building an update request message LURQ including the local update information as well as any other necessary information and instructions.

Figure 10:
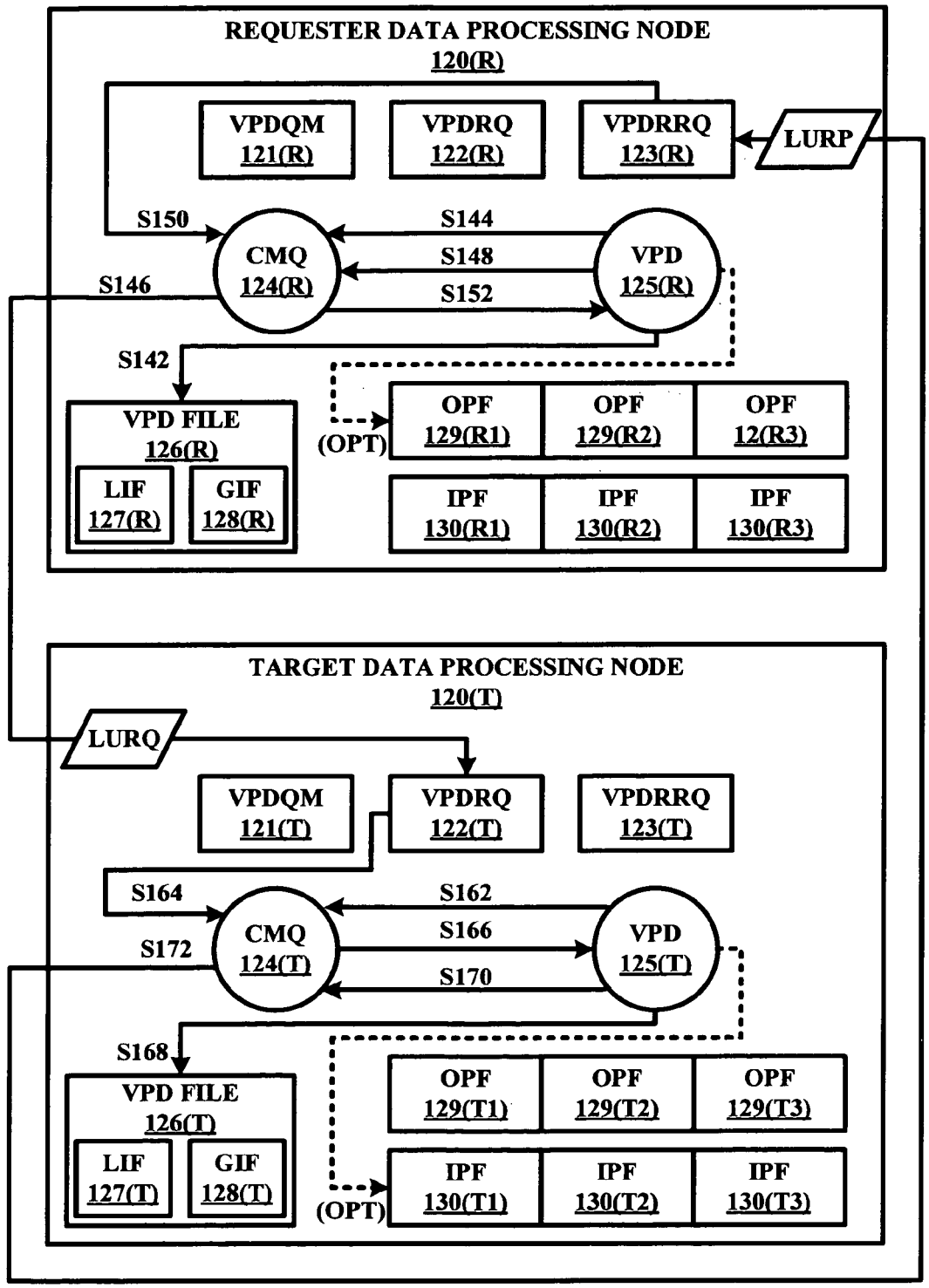
FIG. 10 illustrates an exemplary execution of the flowchart illustrated in FIG. 9.

A stage S144 of flowchart 140 encompasses VPD 125(R) calling CMQ module 124(R) as shown in FIG. 10 to broadcast update request message LURQ for initiating an updating of the relevant local information file 127(T) as stored in VPD file 126(T) by VPD module 125(T).

A stage S146 of flowchart 140 encompasses CMQ module 124(R) pushing update request message LURQ to VPDRQ queue 122(T) of target data processing node 120(T) as shown in FIG. 10

A stage S162 of flowchart 160 encompasses VDP module 125(T) calling CMQ module 124(T) to retrieve the update request message LURQ from VPDRQ queue 122(T) as shown in FIG. 10 in accordance with a polling scheme as represented by a dotted portion of the arrow leading into between stage S162.

A stage S164 of flowchart 160 encompasses CMQ module 124(T) retrieving the update request message LURQ from VPDRQ queue 122(T) as shown in FIG. 10.

A stage S166 of flowchart 160 encompasses CMQ module 124(T) returning the retrieved update request message LURQ to VDP module 125(T) as shown in FIG. 10.

A stage S168 of flowchart 160 encompasses VDP module 125(T) updating the relevant local information file 127(T) of VPD file 126(T) based on the local update information within update request message LURQ as would be appreciated by those having ordinary skill in the art.

A stage S170 of flowchart 160 encompasses VPD module 125(T) calling CMQ module 124(T) to broadcast an update reply message LURP as shown in FIG. 10 for indicating a successful update by VPD module 125(T) of the relevant local information file 127(T) as stored in VPD file 126(T).

A stage S172 of flowchart 160 encompasses CMQ module 124(T) pushing the update reply message LURP to VPDRRQ queue 123(R) of requester data processing node 120(R) as shown in FIG. 10.

A stage S148 of flowchart 140 encompasses VDP module 125(R) calling CMQ module 124(R) to retrieve the update reply message LURP from VPDRRQ queue 123(R) as shown in FIG. 10 in accordance with a polling scheme as represented by a dotted portion of the arrow leading into between stage S148.

A stage S150 of flowchart 140 encompasses CMQ module 124(R) retrieving the update reply message LURP from VPDRRQ queue 123(R) as shown in FIG. 10.

A stage S152 of flowchart 140 encompasses CMQ module 124(R) returning the retrieved update reply message LURP to VDP module 125(R) as shown in FIG. 10.

In an alternative embodiment, stage S144 can further encompass VDP module 125(R) setting OBF flag 129(R1) corresponding to target data processing node 120(T) as an indication of update request message LURQ being pushed by CMQ module 124(R) to VPDRQ queue 122(T), and stage S152 can further encompass VDP module 125(R) resetting OBF flag 129(R1) as an indication of update reply message LURP being pushed by CMQ module 124(T) to VPDRRQ queue 123(R).

Figure 11:
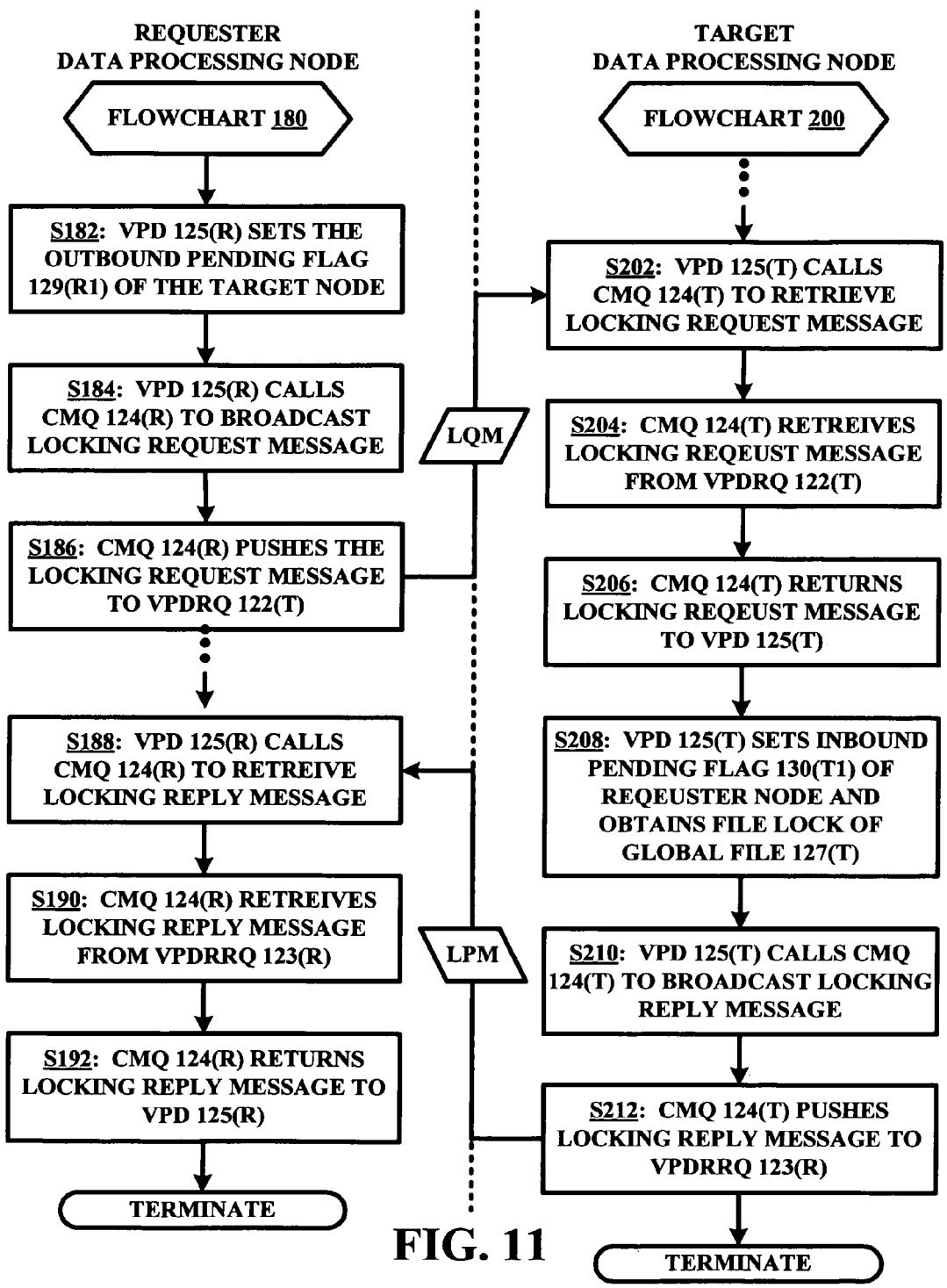
FIG. 11 illustrates a flowchart representative of one embodiment of a global information file locking synchronization method in accordance with the present invention.

FIG. 11 illustrates a flowchart 180 and a flowchart 200 representative of a global information file locking synchronization method as respectively implemented by a requester data processing node and a target data processing node. To facilitate an understanding of the global information file locking synchronization method of the present invention, the subsequent description of flowchart 180 is based on requester data processing node 120(R) shown in FIG. 12 and the subsequent description of flowchart 200 is based on a target data processing node 120(T) shown in FIG. 12.

Figure 12:
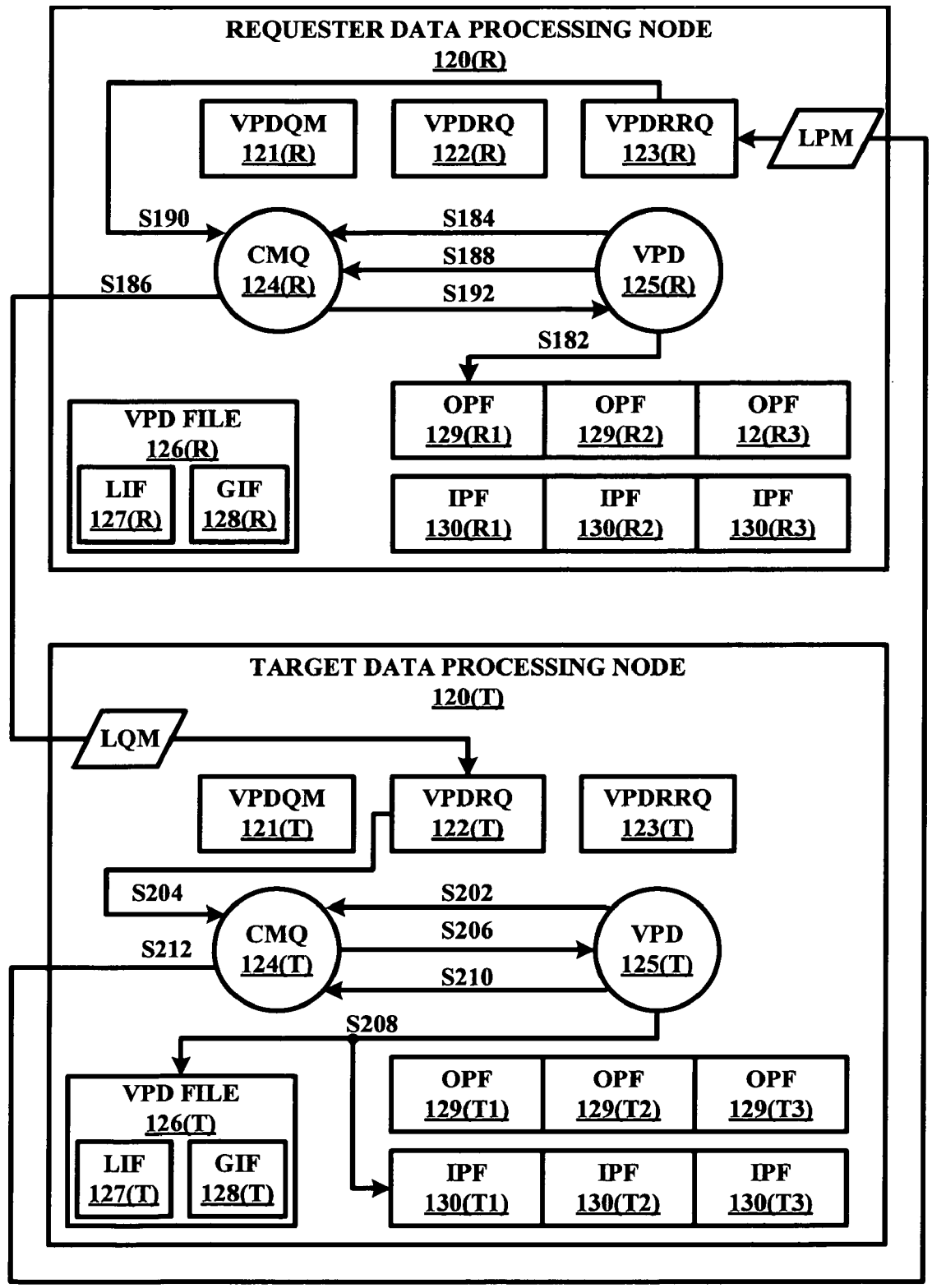
FIG. 12 illustrates an exemplary execution of the flowchart illustrated in FIG. 11.

A stage S182 of flowchart 180 encompasses VPD module 125(R) of requester data processing node 120(R) setting an outbound pending flag 129(R1) corresponding to target data processing node 120(T) as shown in FIG. 12 to track a locking status of the global information file 128(T) as stored in VPD file 126(T).

A stage S184 of flowchart 180 encompasses VPD 125(R) calling CMQ module 124(R) to broadcast a locking request message LQM as shown in FIG. 12 for initiating a locking by VPD module 125(T) of the global information file 128(T) as stored in VPD file 126(T).

A stage S186 of flowchart 180 encompasses CMQ module 124(R) pushing the locking request message LQM to VPDRQ queue 122(T) of target data processing node 120(T) as shown in FIG. 12.

A stage S202 of flowchart 200 encompasses VDP module 125(T) calling CMQ module 124(T) to retrieve the locking request message LQM from VPDRQ queue 122(T) as shown in FIG. 12 in accordance with a polling scheme as represented by a dotted portion of the arrow leading into between stage S202.

A stage S204 of flowchart 200 encompasses CMQ module 124(T) retrieving the locking request message LQM from VPDRQ queue 122(T) as shown in FIG. 12.

A stage S206 of flowchart 200 encompasses CMQ module 124(T) returning the retrieved locking request message LQM to VDP module 125(T) as shown in FIG. 12.

A stage S208 of flowchart 200 encompasses VDP module 125(T) setting an IPF flag 130(T1) corresponding to requester data processing node 120(R) as shown in FIG. 12 to track a locking status of global information file 128(T) stored in VDP file 126(T). Stage S208 further encompasses VDP module 125(T) obtaining a file lock of global information file 128(T) as stored in VPD file 126(T) by VPD module 125(T) as shown in FIG. 12.

A stage S210 of flowchart 200 encompasses VPD module 125(T) calling CMQ module 124(T) to broadcast a locking reply message LPM as shown in FIG. 12 for indicating a successful lock of the global information file 128(T) as stored in VPD file 126(T) by VPD module 125(T).

A stage S212 of flowchart 200 encompasses CMQ module 124(T) pushing the locking reply message LPM to VPDRRQ queue 123(R) of requester data processing node 120(R) as shown in FIG. 12.

A stage S188 of flowchart 180 encompasses VDP module 125(R) calling CMQ module 124(R) to retrieve the locking reply message LPM from VPDRRQ queue 123(R) as shown in FIG. 12 in accordance with a polling scheme as represented by a dotted portion of the arrow leading into between stage S188.

A stage S190 of flowchart 180 encompasses CMQ module 124(R) retrieving the locking reply message LPM from VPDRRQ queue 123(R) as shown in FIG. 12.

A stage S192 of flowchart 180 encompasses CMQ module 124(R) returning the retrieved locking reply message LPM to VDP module 125(R) as shown in FIG. 12.

Referring to FIG. 12, OPF flag 129(R2) and OPF flag 129(R3) of requester data processing node 120(R) correspond respectively to the remaining two target data processing nodes 70, 80 of domain 20. Those having ordinary skill in the art will appreciate a sequential or concurrent implementation of flowchart 180 by requester data processing node 120(R) for each target data processing node via all three (3) OPF flags 129 will achieve a locking synchronization of all global information files stored in the target data processing nodes.

Figure 13:
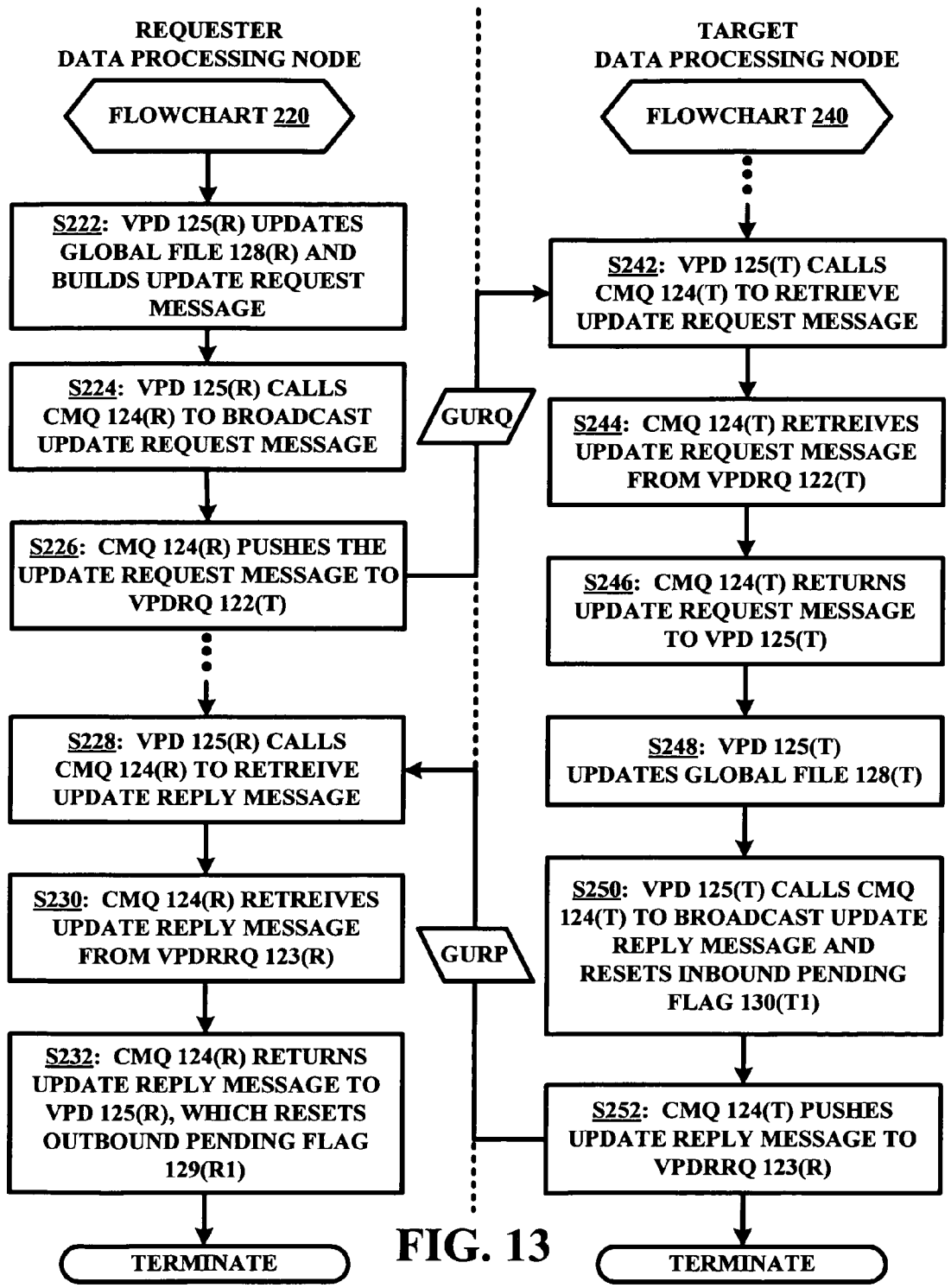
FIG. 13 illustrates a flowchart representative of one embodiment of a global information file update synchronization method in accordance with the present invention.

FIG. 13 illustrates a flowchart 220 and a flowchart 240 representative of a global information file update synchronization method as respectively implemented by a requester data processing node and a target data processing node. To facilitate an understanding of this global information file update synchronization method of the present invention, the subsequent description of flowchart 220 is based on requester data processing node 120(R) shown in FIG. 14 and the subsequent description of flowchart 240 is based on a target data processing node 120(T) shown in FIG. 14.

A stage S222 of flowchart 220 encompasses VPD module 125(R) of requester data processing node 120(R) updating locked global information file 128(R) of VPD file 126(R) based on global update information generated by requester data processing node 120(R) or acquired by requester data processing node 120(R) via an application program interface. Stage S222 further encompasses VPD module 125(R) building an update request message GURQ including the global update information as well as any other necessary information and instructions.

Figure 14:
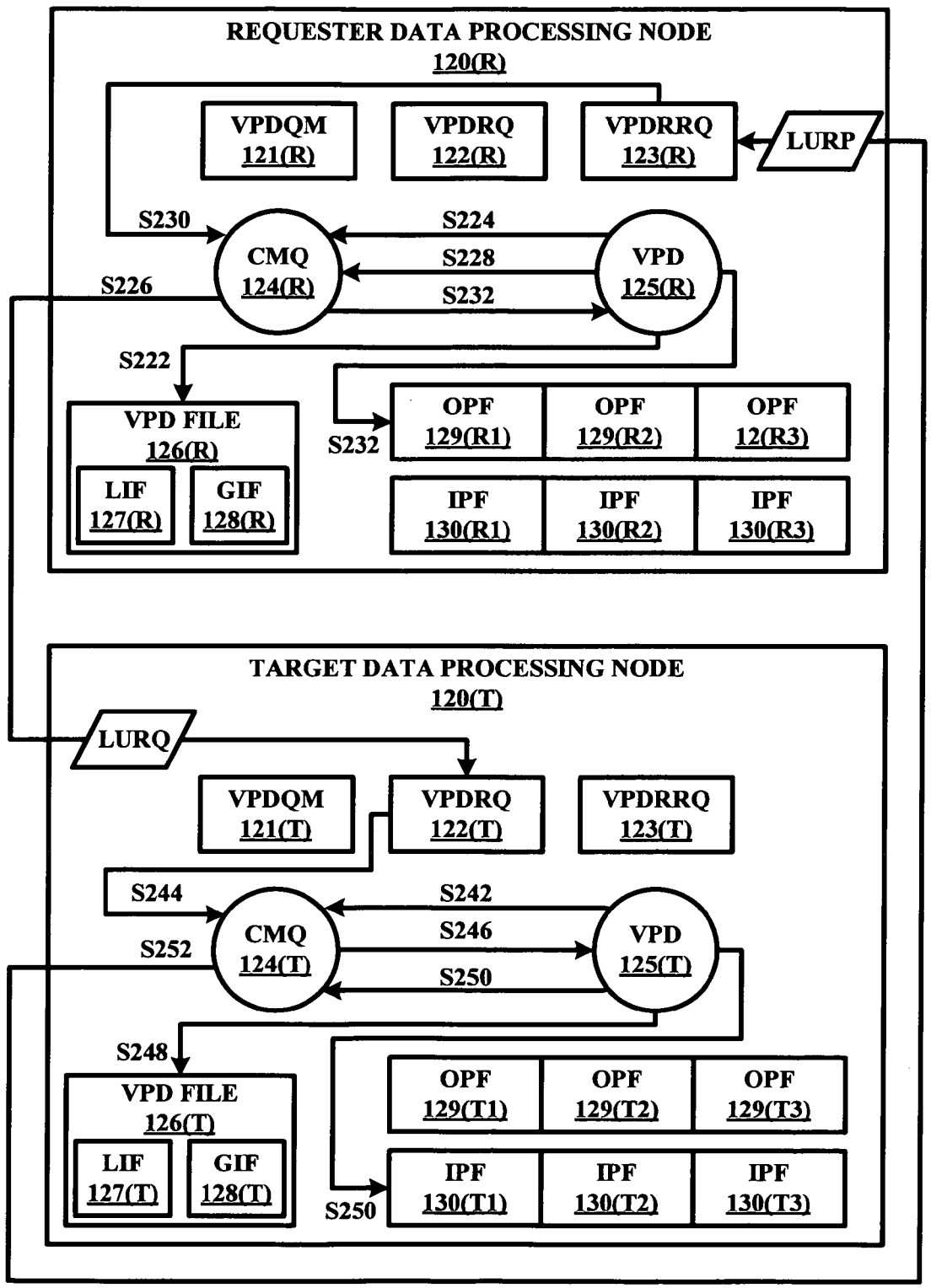
FIG. 14 illustrates an exemplary execution of the flowchart illustrated in FIG. 13.

A stage S224 of flowchart 220 encompasses VPD 125(R) calling CMQ module 124(R) to broadcast update request message GURQ as shown in FIG. 14 for initiating an updating of locked global information file 128(T) as stored in VPD file 126(T) by VPD module 125(T).

A stage S226 of flowchart 220 encompasses CMQ module 124(R) pushing update request message GURQ to VPDRQ queue 122(T) of target data processing node 120(T) as shown in FIG. 14.

A stage S242 of flowchart 240 encompasses VDP module 125(T) calling CMQ module 124(T) to retrieve the update request message GURQ from VPDRQ queue 122(T) as shown in FIG. 14 in accordance with a polling scheme as represented by a dotted portion of the arrow leading into between stage S242.

A stage S244 of flowchart 240 encompasses CMQ module 124(T) retrieving the update request message GURQ from VPDRQ queue 122(T) as shown in FIG. 14.

A stage S246 of flowchart 240 encompasses CMQ module 124(T) returning the retrieved update request message GURQ to VDP module 125(T) as shown in FIG. 14.

A stage S248 of flowchart 240 encompasses VDP module 125(T) updating locked global information file 128(T) of VPD file 126(T) based on the global update information within update request message GURQ as would be appreciated by those having ordinary skill in the art.

A stage S250 of flowchart 240 encompasses VPD module 125(T) calling CMQ module 124(T) to broadcast an update reply message GURP as shown in FIG. 14 for indicating a successful update by VPD module 125(T) of locked global information file 128(T) as stored in VPD file 126(T). Stage S250 further encompasses VPD module 125(T) clearing IBF flag 130(T1) corresponding to requester data processing node 120(R) as shown in FIG. 14.

A stage S252 of flowchart 240 encompasses CMQ module 124(T) pushing the update reply message GURP to VPDRRQ queue 123(R) of requester data processing node 120(R) as shown in FIG. 14.

A stage S228 of flowchart 220 encompasses VDP module 125(R) calling CMQ module 124(R) to retrieve the update reply message GURP from VPDRRQ queue 123(R) as shown in FIG. 14 in accordance with a polling scheme as represented by a dotted portion of the arrow leading into between stage S228.

A stage S230 of flowchart 220 encompasses CMQ module 124(R) retrieving the update reply message GURP from VPDRRQ queue 123(R) as shown in FIG. 14.

A stage S232 of flowchart 220 encompasses CMQ module 124(R) returning the retrieved update reply message GURP to VDP module 125(R) as shown in FIG. 14. Stage S232 further encompass VDP module 125(R) resetting OBF flag 129(R1) corresponding to target data processing node 120(T).

Again, referring to FIG. 14, OPF flag 129 (R2) and OPF flag 129 (R3) of requester data processing node 120(R) correspond respectively to the remaining two target data processing nodes 70, 80 of domain 20. Those having ordinary skill in the art will appreciate a sequential or concurrent implementation of flowchart 220 by requester data processing node 120(R) for each target data processing node via all three (3) OPF flags 129 will achieve an update synchronization of all global information stored in the target data processing nodes.

Referring to FIGS. 1-14, those having ordinary skill in the art will appreciate various benefits and advantages of the present invention, including, but not limited to, an achievement of consistent local information and global information across an entirety physical boundary of a distributed data processing domain. Those having ordinary skill in the art will further appreciate how achieve consistent cluster information or any other type of domain information across an entirety physical boundary of a distributed data processing domain.

Referring to FIG. 1, the term "processor" as used herein is broadly defined as one or more processing units of any type for performing all arithmetic and logical operations and decoding and executing all instructions related to facilitating an implementation by a data processing node of a synchronization method of the present invention. Additionally, the term "memory" as used herein is broadly defined as encompassing all storage space of any type within a data processing node.

Referring to FIGS. 1-14, a domain of the present invention can have a X number of clusters and a Y number of nodes in each cluster or domain, where $X \geq 0$ and $Y \geq 2$. From the description herein of the present invention, those having ordinary skill in the art of file synchronization techniques will appreciate how to apply the inventive principles of the present invention to distributed data processing domains that are more or less complex than the 2 cluster/2 node per cluster configuration shown in FIG. 1.

Furthermore, those having ordinary skill in the art of file synchronization techniques may develop other embodiments of the present invention in view of the inventive principles of the present invention described herein. Thus, the terms and expression which have been employed in the foregoing specification are used herein as terms of description and not of limitations, and there is no intention in the use of such terms and expressions of excluding equivalents of the features shown and described or portions thereof, it being recognized that the scope of the present invention is defined and limited only by the claims which follow.

We claim:

1. A method, comprising:
   maintaining by each of a plurality of data processing nodes, a local information file having information on individual data processing operations of the data processing node maintaining the local information, one local information file for each of the data processing nodes with which the data processing node communicates having information on individual operations of the data processing node for which the local information file is maintained, and a global information file having information associated with collective operations of the data processing nodes;
   generating or acquiring, by a requester data processing node comprising one of the data processing nodes, local update information within the local information file for the requester data processing node, wherein the local update information concerns the individual data processing operation of the requester data processing node;
   synchronizing, by the requester data processing node, an update of the local update information to the local information files for the requester data processing node at target data processing nodes comprising the nodes with which the requester data processing node communicates, wherein the local information files for the requester data processing node at the target data processing nodes include information on the individual operations of the requester data processing node with the local update information generated by the requester data processing node;
   detecting, by the requester data processing node, global update information within the requester data processing global information file concerning a collective operation of the requester and the target data processing nodes;

synchronizing, by the requester data processing node, the global update information with the global information files at the target data processing nodes, wherein each of the data processing nodes functions as the requester data processing node and the target data processing node for purposes of synchronizing local update and global update information.

2. The method of claim 1, wherein the synchronization by the requester data processing node of the update of each local information file for the requester data processing node at each of the target data processing nodes with the local update information includes:
   a communication of an update request message from the requester data processing node to each target data processing node, the update request message including the local update information for the requester data processing node individual operation;
   an updating by each target data processing node of its respective local information file for the requester data processing node based on the communication of the update request message from the requester data processing node to each target data processing node; and
   a communication of an update reply message from each target data processing node to the requester data processing node based on the updating by each target data processing node of its respective local information file for the requester data processing node individual operation.

3. The method of claim 1, wherein the synchronization, by the requester node, of the global update information with the global information files at the target nodes comprises:
   locking, by the requester data processing node, each global information file at the target data processing nodes; and
   a synchronization by the requester data processing node of the global update information to each locked global information file.

4. The method of claim 1, wherein the synchronization by the requester data processing node of the locking of each global information file includes:
   a communication of a locking request message from the requester data processing node to each target data processing node;
   a locking by each target data processing node of its respective global information file based on the communication of the locking request message from the requester data processing node to each target data processing node; and
   a communication of a locking reply message from each target data processing node to the requester data processing node based on the locking by each target data processing node of its respective global information file.

5. The method of claim 1, wherein the synchronization by the requester data processing node of the update of each locked global information file based on the global update information includes:
   a communication of an update request message from the requester data processing node to each target data processing node, the update request message including the global update information;
   an updating by each target data processing node of its respective locked global information file based on the communication of the update request message from the requester data processing node to each target data processing node; and
   a communication of an update reply message from each target data processing node to the requester data processing node based on the updating by each target data processing node of its respective locked global information file.

6. The method of claim 5, wherein the synchronization by the requester data processing node of the update of each locked global information file based on the global update information further includes:
   an unlocking by each target data processing node of its respective global information file based on the updating by each target data processing node of its respective locked global information file.

7. The method of claim 1,
   wherein the synchronization of the global information file comprises locking the global information file for the target data processing nodes and the requester data processing node and unlocking the global information file at the nodes in response to updating the global information files; and
   wherein the synchronization of the local information files comprises maintaining the local information files unlocked while updating the local information files in the target data processing nodes and the requester data processing node.

8. The method of claim 1, wherein the synchronizing by the requester data processing node of the local information files at the requester data processing node is performed without locking the local information files for the requester data processing node at the target data processing nodes and wherein the synchronizing by the requester data processing node of the global information files at the target data processing nodes is performed by locking the global information files at the target data processing nodes when updating.

9. A distributed data processing domain comprising a plurality of data processing nodes, wherein each data processing node comprises:
   a processor;
   a memory accessible to the processor maintaining a local information file having information on individual data processing operations of the data processing node maintaining the local information, one local information file for each of the data processing nodes with which the data processing node communicates having information on individual operations of the data processing node for which the local information file is maintained, and a global information file having information associated with collective operations of the data processing nodes;
   wherein the memory further includes instructions executed by the processor to cause the data processing node to operate as a requester data processing node to perform operations comprising:
      generating or acquiring local update information within the local information file for the requester data processing node, wherein the local update information concerns the individual data processing operation of the requester data processing node;
      synchronizing an update of the local update information to the local information files for the requester data processing node at target data processing nodes comprising the data processing nodes in the domain with which the requester data processing node communicates, wherein the local information files for the requester data processing node at the target data processing nodes include information on the individual operations of the requester data processing node with the local update information generated by the requester data processing node;

detecting global update information within the requester data processing node global information file concerning a collective operation of the requester and the target data processing nodes;

synchronizing the global update information with the global information files at the target data processing nodes, wherein each of the data processing nodes functions as the requester data processing node and the target data processing node for purposes of synchronizing local update and global update information.

10. The distributed data processing domain of claim 9, wherein the synchronization by the requester data processing node of the update of each local information file or the requester data processing node at each of the target data processing nodes with the local update information includes:

a communication of an update request message from the requester data processing node to each target data processing node, the update request message including the local update information for the requester data processing node individual operation for an updating by each target data processing node of its respective local information file; and a communication of an update reply message from each target data processing node to the requester data processing node based on the updating by each target data processing node of its respective local information file for the requester data processing node individual operation.

11. The distributed data processing domain of claim 9, wherein the synchronization, by the requester node, of the global update information with the global information files at the target nodes comprises:

locking each global information file at the target data processing nodes; and a synchronization by the requester data processing node of the global update information to each locked global information file.

12. The distributed data processing domain of claim 11, wherein the synchronization by the requester data processing node of the locking of each global information file includes:

a communication of a locking request message from the requester data processing node to each target data processing node, the locking request message for requesting a locking by each target data processing node of its respective global information file; and a communication of a locking reply message from each target data processing node to the requester data processing node based on the locking by each target data processing node of its respective global information file.

13. The distributed data processing domain of claim 11, wherein the synchronization by the requester data processing node of the update of each locked global information file based on the global update information includes:

a communication of an update request message from the requester data processing node to each target data processing node, the update request message including the global update information for an updating by each target data processing node of its respective locked global information file; and a communication of an update reply message from each target data processing node to the requester data processing node based on the updating by each target data processing node of its respective locked global information file.

14. The data processing domain of claim 13, wherein the communication of the update reply message from each target data processing node to the requester data processing node is further based on an unlocking by each target data processing node of its respective updated global information file.

15. The distributed data processing domain of claim 9, wherein the synchronization of the global information file comprises locking the global information file for the target data processing nodes and the requester data processing node and unlocking the global information file at the nodes in response to updating the global information files; and wherein the synchronization of the local information files comprises maintaining the local information files unlocked while updating the local information files in the target data processing nodes and the requester data processing node.

16. The distributed data processing domain of claim 9, wherein the synchronizing by the requester data processing node of the local information files at the requester data processing node is performed without locking the local information files for the requester data processing node at the target data processing nodes and wherein the synchronizing by the requester data processing node of the global information files at the target data processing nodes is performed by locking the global information files at the target data processing nodes when updating.

17. A processor readable memory including instructions executed by a requester data processing node in communication with target data processing nodes in a distributed data processing domain, wherein the executed instructions cause operations, the operations comprising:

maintaining a local information file having information on individual data processing operations of the data processing node maintaining the local information, one local information file for each of the data processing nodes with which the requester data processing node communicates having information on individual operations of the data processing node for which the local information file is maintained, and a global information file having information associated with collective operations of the data processing nodes, wherein the target data processing nodes maintain the local information file for the requester data processing node individual operations;

generating or acquiring local update information within the local information file for the requester data processing node, wherein the local update information concerns the individual data processing operation of the requester data processing node;

synchronizing an update of the local update information to the local information files for the requester data processing node at target data processing nodes comprising the nodes with which the requester data processing node communicates, wherein the local information files for the requester data processing node at the target data processing nodes include information on the individual operations of the requester data processing node with the local update information generated by the requester data processing node;

detecting global update information within the requester data processing node global information file concerning a collective operation of the requester and the target data processing nodes;

synchronizing the global update information with the global information files at the target data processing nodes, wherein each of the data processing nodes functions as the requester data processing node and the target data processing node for purposes of synchronizing local update and global update information.

18. The processor readable memory of claim 17, wherein the synchronization by the requester data processing node at each of the target data processing nodes with the local update information comprises:
- a communication of an update request message from the requester data processing node to each target data processing node, the update request message including the local update information for the requester data processing node individual operation for an updating by each target data processing node of its respective local file; and
- a communication of an update reply message from each target data processing node to the requester data processing node based on the updating by each target data processing node of its respective local information file for the requester data processing node individual operation.

19. The processor readable memory of claim 17, wherein the synchronization, by the requester node, of the global update information with the global information files at the target nodes comprises:
- a locking of each global information file at the target data processing nodes; and
- a synchronization of the global update information to each locked global information file based.

20. The processor readable memory of claim 19, wherein the synchronization by the command messenger module of the locking of each global information file includes:
- a communication of a locking request message from the requester data processing node to each target data processing node, the locking request message for requesting a locking by each target data processing node of its respective global information file; and
- a communication of a locking reply message from each target data processing node to the requester data processing node based on the locking by each target data processing node of its respective global information file.

21. The processor readable memory of claim 20, wherein the synchronization by the command messenger module of the update of each locked global information file based on the global update information includes:
- a communication of an update request message from the requester data processing node to each target data processing node, the update request message including the global update information for an updating by each target data processing node of its respective locked global information file; and
- a communication of an update reply message from each target data processing node to the requester data processing node based on the updating by each target data processing node of its respective locked global information file.

22. The processor readable memory of claim 21, wherein the communication of the update reply message from each target data processing node to the requester data processing node is further based on an unlocking by each target data processing node of its respective updated global information file.

23. The processor readable memory of claim 17,
- wherein the synchronization of the global information file comprises locking the global information file for the target data processing nodes and the requester data processing node and unlocking the global information file at the nodes in response to updating the global information files; and
- wherein the synchronization of the local information files comprises maintaining the local information files unlocked while updating the local information files in the target data processing nodes and the requester data processing node.

24. The processor readable memory of claim 17, wherein the synchronizing by the requester data processing node of the local information files at the requester data processing node is performed without locking the local information files for the requester data processing node at the target data processing nodes and wherein the synchronizing by the requester data processing node of the global information files at the target data processing nodes is performed by locking the global information files at the target data processing nodes when updating.

* * * * *